(12) United States Patent
Chen et al.

(10) Patent No.: US 6,977,790 B1
(45) Date of Patent: Dec. 20, 2005

(54) DESIGN SCHEME TO INCREASE THE GAIN OF STRAIN BASED SENSORS IN HARD DISK DRIVE ACTUATORS

(75) Inventors: Yih-Jen D. Chen, Milpitas, CA (US); David M. Tung, Livermore, CA (US); Lin Guo, Milpitas, CA (US); Wei Guo, Fremont, CA (US); Bill Wang, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 225 days.

(21) Appl. No.: 10/138,035

(22) Filed: May 3, 2002

Related U.S. Application Data

(60) Provisional application No. 60/288,816, filed on May 4, 2001.

(51) Int. Cl.[7] .......................... G11B 21/02; G11B 5/596
(52) U.S. Cl. .................. 360/75; 360/77.02; 360/78.12; 360/294.1; 360/264.1; 360/244; 29/603.03
(58) Field of Search .................. 360/75, 31, 78.05, 360/78.12, 244.1, 294.1, 294.4, 294.3, 77.02, 360/264.1, 244; 310/317, 318; 29/603.03

(56) References Cited

U.S. PATENT DOCUMENTS

| | | | | |
|---|---|---|---|---|
| 5,764,444 A | * | 6/1998 | Imamura et al. | 360/294.4 |
| 6,064,540 A | | 5/2000 | Huang et al. | |
| 6,310,746 B1 | * | 10/2001 | Hawwa et al. | 360/97.01 |
| 2002/0063989 A1 | * | 5/2002 | White et al. | 360/77.03 |

* cited by examiner

Primary Examiner—Andrew L. Sniezek

(57) ABSTRACT

An actuator arm assembly has an actuator arm and an actuator for moving the actuator arm whereby the arm assembly experiences vibrations. The actuator has a body with a recess formed therein, and a strain sensor is fitted essentially inside the recess such that the sensor generates signals correlated to the vibrations. This arrangement produces a high gain boost from the strain based sensor, making an amplifier circuit unnecessary. The sensor signals are used to damp the vibrations.

34 Claims, 6 Drawing Sheets

DESIGN SCHEME TO INCREASE THE GAIN OF STRAIN BASED SENSORS IN HARD DISK DRIVE ACTUATORS

RELATED APPLICATIONS

Applicant claims the priority of U.S. Provisional Application No. 60/288,816, entitled "Design Scheme to Increase the Gain of Strain Based Sensors in Hard Disk Drive Actuators", filed on May 4, 2001, which is incorporated herein by reference.

FIELD OF THE INVENTION

This invention relates to an apparatus for and a method of control for increasing the gain of strain based sensors in hard disk drive actuators for stabilizing multiple vibration modes of an actuator system.

BACKGROUND OF THE INVENTION

Disk drives are well known in the computer art for providing secondary mass storage with random access. A disk drive essentially comprises one or more magnetic data storage disks rotating on a spindle by a spindle motor, within an enclosed housing. A magnetic transducer head is placed on an actuator arm system and positioned very closely to each data storage surface by a slider suspended upon an air bearing. Servo information are typically written in servo sectors which interrupt data sectors or blocks. Servo information provide a servo control loop in the disk drive with head position information to enable a head positioner mechanism, such as a rotary voice coil motor, to move the actuator, and therefore the head, from track to track during random access track seeking operations, and to maintain the head in proper alignment with a track centerline during track following operations when user data is written to or read from the available data block storage areas of the disk surface.

A such, the servo control loop is used to control head positioning as the head is being moved transversely across tracks by the actuator, and to cause the head to remain over a particular data track as the disk spins. The servo loop controls the acceleration of the head which results from a force supplied by the electric motor on the actuator.

Servo-controlled actuator systems experience serious problems due to mechanical actuator resonances. As described in U.S. Pat. No. 6,064,540, by Huang, et al., these vibrational modes include the natural modes of the actuator and those of any intervening mechanical components. With increasing mechanical complexity, the vibrational modes of any given actuator system become difficult to predict. The problem is further compounded as the operating frequency of the actuator system is increased. The vibrational modes limit the control loop gain of the servo system, reduce bandwidth of the servo system, or both. This causes the controlled element, such as a transducer head, to experience excessive settling time after positioning, poor response to disturbances, poor tracking ability, or any combination of these.

Prior art systems have attempted to ensure stable operation of actuator systems by stabilizing the control loop. This has been done by inserting gain stabilizing filters such as electronic notch filters in the control loop path. These filters are placed in the downstream portion of the control loop to filter out the signal information within the band reject frequency range of the notch and thus help minimize excitation of these actuator vibrational modes. The technique utilizing notch filters allows the servo control system to effectively ignore lightly damped structural actuator resonances. At these resonances very little control is applied by the servo controller.

The drawback to this technique is that it depends on the ability of the designer to accurately predict the frequency of the vibrational modes. This becomes increasingly difficult in high accuracy regimes because the servo system is exposed to many unforeseen disturbances that excite unanticipated vibrational modes. For example, in a hard drive actuator such disturbances include servo amplifier saturation and distortion, external forces on the arm assembly, e.g., due to seek activity, air turbulence, stiction and the like. Such disturbances are typically generated at points in the control path where correction is impossible when gain stabilizing filters are present in the control loop. Consequently, although notch filters are useful in reducing predicted resonances of the servo control system, they do not inhibit the excitation of other vibrational modes by agents external to the servo control loop.

The prior art also teaches gain stabilization through low-pass filtering in the control loop. In this approach the cutoff frequency of a low-pass filter that is inserted in the control loop is generally lower than the frequencies of any of the lightly damped resonances of the actuator structure. Thus, the components of the control signal having the resonance frequency are effectively prevented from exciting the vibrational modes of the actuator structure. This helps ensure system stability, but it also increases the phase shift at frequencies in the vicinity of the servo loop's unity gain crossing, thereby reducing the bandwidth of the servo system. In fact, this drawback applies to all gain stabilizing filters, including notch filters. The reduction in bandwidth, in turn, reduces the ability of the servo system to correct low frequency vibration and tracking performance such as run out and other disturbances that are due to external excitation and non-linearities in positioning operations.

In alleviating the problem of stabilizing servo-controlled actuator systems, solutions using filtering techniques are inadequate in high-accuracy regimes, e.g., in high density hard disk drives, since they require a priori knowledge of the vibrational modes of the system. Meanwhile, solving a transfer function to determine the vibrational modes is computationally unfeasible or impossible in most practical cases. And, such prior art systems suffer from the limitation of not being able to actively compensate for multiple vibrational modes at the same time. Specifically, if more than one single mode is selected for active control system stability is at risk.

In the aforementioned U.S. Pat. No. 6,064,540, Huang, et al., suggest an active control mechanism and method for stabilizing a servo-controlled actuator system such as an actuator system in a data recording disk drive by compensating the vibrational modes of the actuator's arm assembly. The control mechanism has a sensing arrangement which can include one or more individual sensors attached to the actuator at locations where they generate signals in phase with the vibrational modes, and especially with all the major vibrational modes, of the arm assembly. A control mechanism derives from the signals an adjustment signal consisting of three corrective terms—a stiffening correction, an active damping correction and an inertia reduction correction—and the adjustment signal is used in the feedback control loop to stabilize the actuator system.

However, such conventional systems that use strain based sensors often need analog pre-amplifier sections to boost the signal from the sensor. Such amplification circuits consume electronic real-estate, and add to the costs of manufacturing and maintaining the disk drives.

BRIEF SUMMARY OF THE INVENTION

Accordingly, the present invention provides a method and apparatus that eliminates the need for the analog gain pre-amplifier sections for strain based sensors, and instead provides a mechanical modification to the actuator arm to amplify the strain based sensors' output signal. An objective of the present invention is to provide a strain based sensor placement on a disk drive actuator body that provides an amplified and stabilized analog signal for various applications. One application of this method is the implementation of strain based sensors in actuator active damping control. Another objective is to create a localized strain concentration while preventing major influences on the actuator dynamic such as the slider and actuator resonant frequencies.

In embodiment, the present invention provides an actuator arm assembly, comprising an actuator arm; an actuator for moving said actuator arm whereby the arm assembly experiences vibrations, the actuator having a body with a recess formed therein; and a strain sensor fitted essentially inside said recess such that the sensor generates signals correlated to said vibrations. This arrangement produces a high gain boost from the strain based sensor, making an amplifier circuit unnecessary.

BRIEF DESCRIPTION OF THE DRAWINGS

These and other features, aspects and advantages of the present invention will become understood with reference to the following description, appended claims and accompanying figures where:

Like reference numbers refer to like elements.

DETAILED DESCRIPTION OF THE INVENTION

Figure 1:
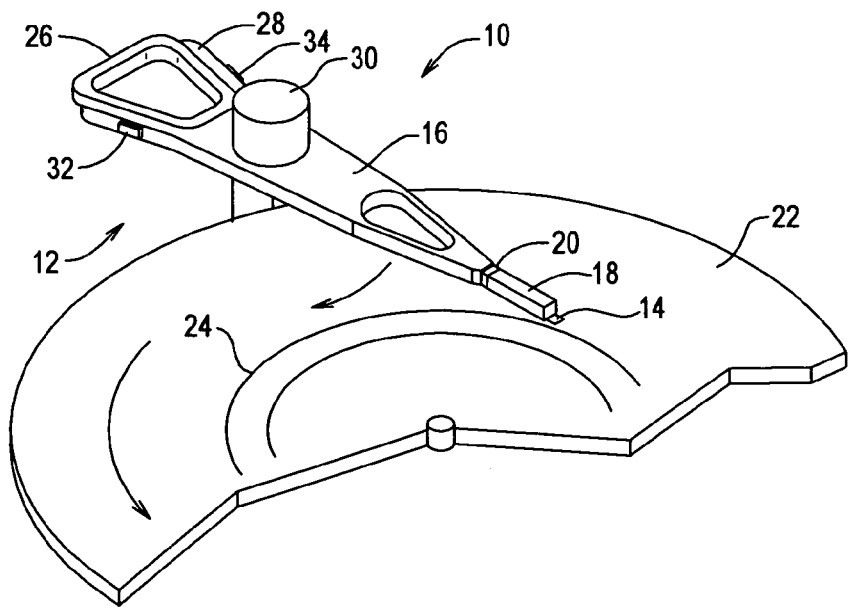
FIG. 1 is an isometric view of a conventional actuator system with an arm assembly.

FIG. 1 illustrates a diagram of a conventional servo-controlled actuator system 10 for a hard disk drive. The actuator system 10 has an arm assembly 12 equipped with a controlled element such as a read/write head 14. The arm assembly 12 has a main arm 16 and a secondary arm 18 joined with the main arm 16 by a joint 20. The entire assembly 12 is mounted on a hub (pivot) 30, and the head 14 is positioned above a disk 22 with concentric data tracks 24 and accesses various tracks 24 during operation by pivoting or rotating around a hub 30. This general construction of arm assembly 12 is well-known in the art of hard disk drives. An actuator 26, such as a coil (e.g. a VCM coil), is mounted in a cradle or coil support 28 opposite the head 14. The actuator 26 moves the arm assembly 12 by causing it to rotate about the hub 30. Consequently, the actuator 26 is also known as a rotary actuator. The amount of rotation is controlled by a feedback signal in the form of a current passed through the coil 26.

As discussed, high frequency mechanical resonances (or vibrations) of the main actuator in storage devices such as disk drives is undesirable. A typical actuator can resonate at several higher frequencies and, because of this, the tracking servo bandwidth must be limited so that it does not respond to these unwanted resonances. This reduces the ability of the servo to quickly respond as disturbances move the head off its track center, contributing to increased track mis-registration (TMR).

Figure 2:
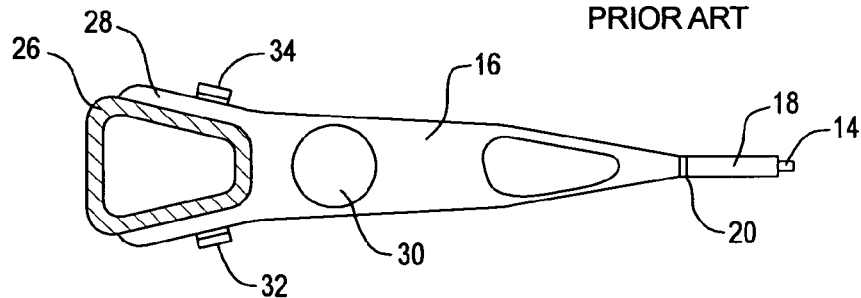
FIG. 2 is a top plan view of the arm assembly of the system of FIG. 1.

To alleviate said resonance problems, active damping uses a strain based sensor (e.g., piezoelectric sensor) on the actuator body that senses resonances as they occur. The sensor output signal is used by a tracking servo to change the dynamics of the actuator so that the resonances are reduced or damped. The tracking servo bandwidth can then be extended, allowing further increases in track density. FIG. 2 is a top plan view of the actuator assembly of FIG. 1, illustrating two sensors 32 and 34 attached to the arm assembly 12 on the surface of the cradle 28 along two sides of the coil 26. In this position, sensors 32, 34 are sensitive to the in-plane sway deformations experienced by the coil 26. When the arm assembly 12 experiences vibrational modes during operation, the sensors 32, 34 generate signals correlated to these modes. The in-plane sway deformations of the coil 26 translate into deformations of the cradle 28.

As described in above-mentioned U.S. Pat. No. 6,064,540, by Huang, et al. an empirical approach is used to obtain a transfer function, H(s), describing the vibrational modes of an arm assembly. The gain of one or more of the modes is responsible for the limited operation bandwidth of a typical arm assembly. To properly compensate these modes, as well as any other modes of the arm assembly 12 requiring active compensation, the sensors 32, 34 are positioned such that their signals are correlated to the modes of arm assembly 12. As is true of any mechanical system, when the arm assembly 12 vibrates, the vibration can be decomposed into several vibrational modes which have their own unique vibration shapes called "mode shapes", described by example in the U.S. Pat. No. 6,064,540. The use of the signals from the sensors 32, 34 in the servo control loop for active damping is described in said U.S. Pat. No. 6,064,540. However, as mentioned, such sensor placement requires analog pre-amplifier sections to boost the signal from the sensor. The amplification circuits consume electronic real-estate and add to the costs of manufacturing and maintaining the disk drives.

The present invention provides a method and apparatus to increase the sensitivity of strain based sensors for the actuator arm, without the need for conventional amplifier sections to boost the signal from the sensors. In one embodiment, the present invention provides a mechanical modification to the actuator arm assembly to increase the strain based sensors' output signal. As such, a strain based sensor placement on a disk drive actuator body is described which provides an increased and stabilized analog signal for various applications, such as in the implementation of strain based sensors in actuator active damping control mentioned above. The present invention allows sensing localized strain concentration while preventing major influences on the actuator dynamic such as the slider and actuator resonant frequencies.

Figure 3A:
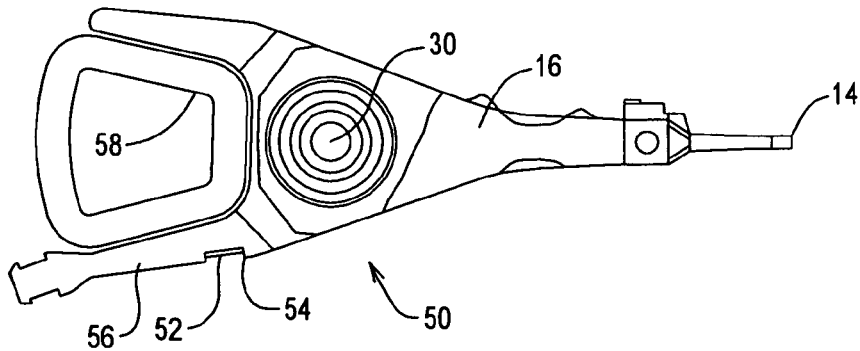
FIG. 3A shows an example diagram of an embodiment of an actuator arm assembly according to the present invention.
Figure 3B:
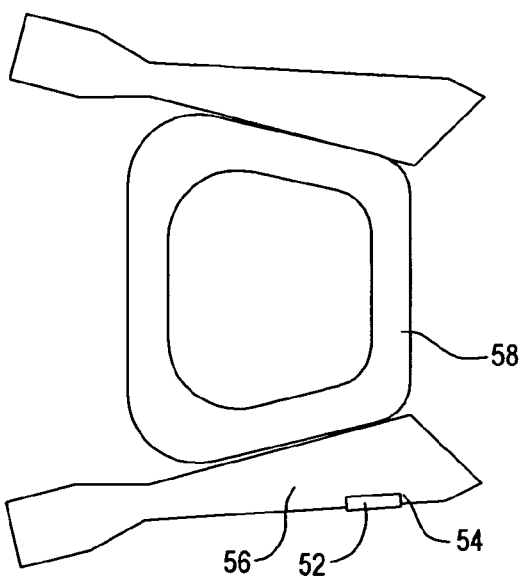
FIG. 3B shows a portion of the actuator arm assembly and strain based sensor of FIG. 3A, according to the present invention.
Figure 3C:
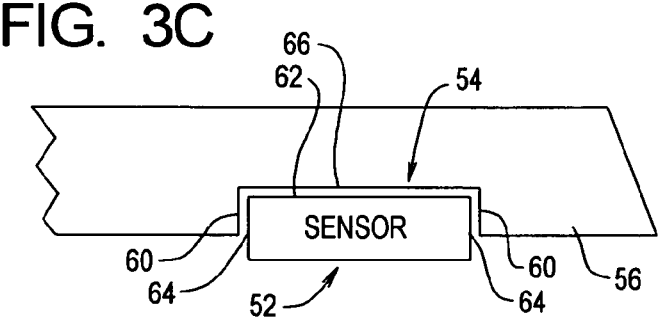
FIG. 3C shows a more detailed top view of the example notch and sensor of FIG. 3A.

FIG. 3A shows an example diagram of an embodiment of an actuator assembly 50 and strain based sensor 52 (e.g., piezoelectric sensor), according to the present invention. The actuator arm assembly 50 includes a recess, indentation or notch 54 at a cradle support 56 portion of the actuator assembly 50 for an actuator coil 58, wherein the strain based sensor 52 is placed in the notch 54, shown in more detail by example of FIG. 3B. The sensor 52 is fitted in the notch 54 to be deformed by the surfaces of the notch 54 under strain. FIG. 3C shows a more detailed top view of the example notch 54 and sensor 52 in the cradle section 56 of the actuator assembly 50. The inventors have discovered that this example arrangement produces a high gain boost from the strain based sensor 52.

Figure 3D:
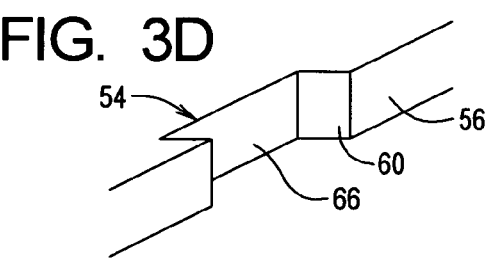
FIG. 3D shows a perspective view of the example notch which is rectangular in shape, to receive a rectangular sensor.
Figure 3E:
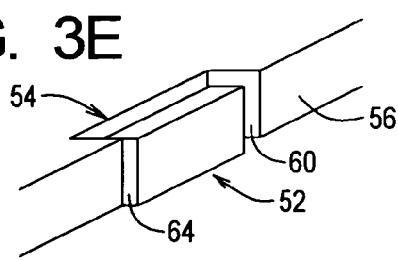
FIG. 3E shows placement of a sensor in the notch of FIG. 3D.

FIG. 3D shows a perspective view of the example notch 54 which is rectangular in shape, to receive the example rectangular sensor 52 as shown in FIG. 3E. As shown in FIGS. 3C–E, the sensor 52 is essentially of the same shape and dimensions as the notch 54, and preferably end walls 64 of the sensor 52 have close tolerances in relation to the end walls 60 of the notch 54 such that deflection of the arm 56 causes the end walls 60 of the notch 54 to compress the end walls 64 of the sensor 52 to generates a strong signal. The sensor 52 detects sway deformations of said coil 58 produced by vibrations in the arm assembly 50. Said sway deformations of the coil 58 produce deformations of coil support 56, sensed by the sensor 52.

Figure 3F:
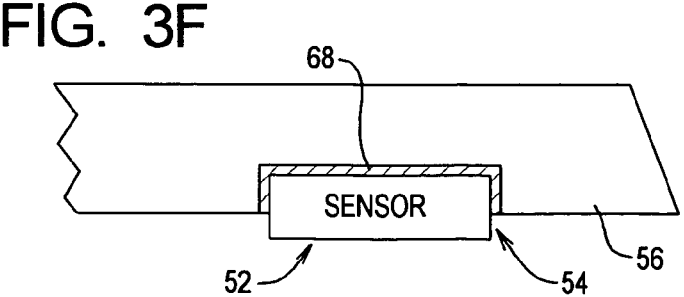
FIG. 3F shows the detailed top view of the example notch and sensor of FIG. 3C with epoxy glue therebetween.

Preferably, the space between the sensor walls 62, 64 and the notch walls 60, 66 are minimized. In practice, typically the sensor shape and dimensions are determined by sensor manufacturers, such as in bulk manufacturing of the sensors. In one example, the sensor 52 can have 2×1 aspect ratio, with a thickness of about ½mm. The notch 54 is formed to be as deep and as thick as the sensor 52, with about a 0.001 inch clearance between the end walls 64 of the sensor 52 and the end walls 60 of the notch 54, wherein as shown by example in FIG. 3F, a high modulus epoxy 68 is used to fill in the clearance. Preferably the epoxy 68 is electrically conductive to provide electrical ground to the sensor 52 through the actuator body 56, and another wire guides output signals from the sensor 52 to the servo controller.

The epoxy 68 is applied to the walls 60, 66 of the notch 54 before the sensor 52 is placed therein, to fill any gaps between the sensor walls 62, 64 and the notch walls 60, 66. In this example, the height of the sensor 52 is that of the thickness of the actuator body 56 where the notch 54 is located, but the sensor height can be smaller or larger. Preferably, the end walls 64 of the sensor 52 have minimum clearance to the end walls 60 of the notch 54. Generally, the end walls 60 of the notch 54 are deflected the most due to vibrations in the actuator body because of actuator movement. As such, though preferable, having minimal clearance between the face wall 62 of the sensor 52 and the face wall 66 of the notch 54 is not critical. The notch 54 increases the gain of the sensor 52 placed therein, without distorting the original design intent of the actuator arm assembly 50.

The high modulus epoxy 68 provides better contact between the surfaces of the sensor 52 and the notch 54, such that deformation of the notch walls 60, 66 are properly communicated to the sensor walls 62, 64 to compress and decompress the sensor 52. For example, the sensor 52 senses when the walls 60 of the notch 54 are pushed towards each other (compressing the sensor 52), and when they are pulled apart from each other (decompressing the sensor 52). The sensor 52 generates a proportionate voltage (current) signal when pushed in (i.e., compressed) or pulled apart by the notch walls 60.

Figure 4:
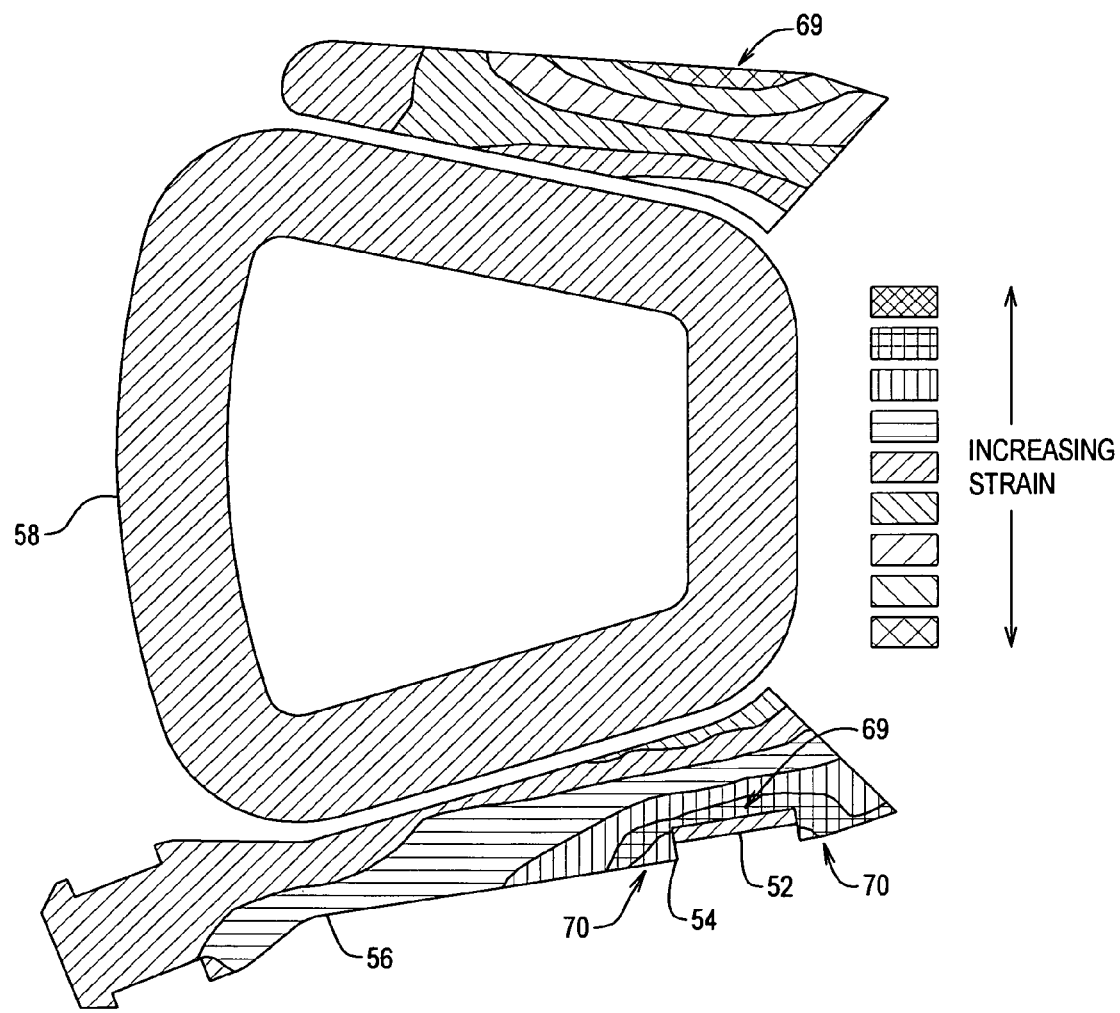
FIG. 4 shows a portion of the actuator arm of FIG. 3A, and localized strain profile for a notch mounted strain sensor according to the present invention.

The notch 54 increases the exertion of strain on the sensor 52 as the actuator arm bends (deflects), and the location of the notch 54 on the arm 50 should be selected to provide highest strain on the sensor 52. The example in FIG. 4 shows said portion 56 of the actuator arm of FIG. 3B, and localized strain profile for notch mounted strain sensor 52, wherein the notch 54 is formed at the general zone 69 of maximum strain (peak strain is symmetric around the center but opposite in sign). The sensor 52 has a e.g. 4×3×0.5 aspect ratio and is placed 0.6 mm inside the notch 54 on the cradle 56, which is 1 mm toward the actuator pivot. Other aspect ratios and dimensions for the sensor 52 are possible whereby the sensor 52 flexes under strain, including for example: 4×2×0.5, 4×2×0.25, 3×1×0.5, 3×0.5×1, etc.

In the example strain profile of FIG. 4, the darker colors 70 indicate more strain at that location. The strain on the arm 56 is caused by mass and kinetic energy as the arm moves and deforms, putting pressure on the sensor 52 via the notch 54. The voltage from the sensor 52 is proportional to the amount of strain on the sensor 52.

The deflection of the end walls 60 of the notch 54 due to motion of the actuator arm, provides increased signal output from the sensor 52 compared to conventional systems wherein the same sensor is simply placed on the surface of the actuator arm (e.g., FIGS. 1–2) as in the above-mentioned U.S. Pat. No. 6,064,540. In one example, the sensor output according to the present invention is at least twice that of conventional systems. As such, forming the notch 54 in the actuator arm and placing the sensor 52 in the notch 54, provides increased sensor sensitivity to the strain on the actuator arm.

Figure 5:
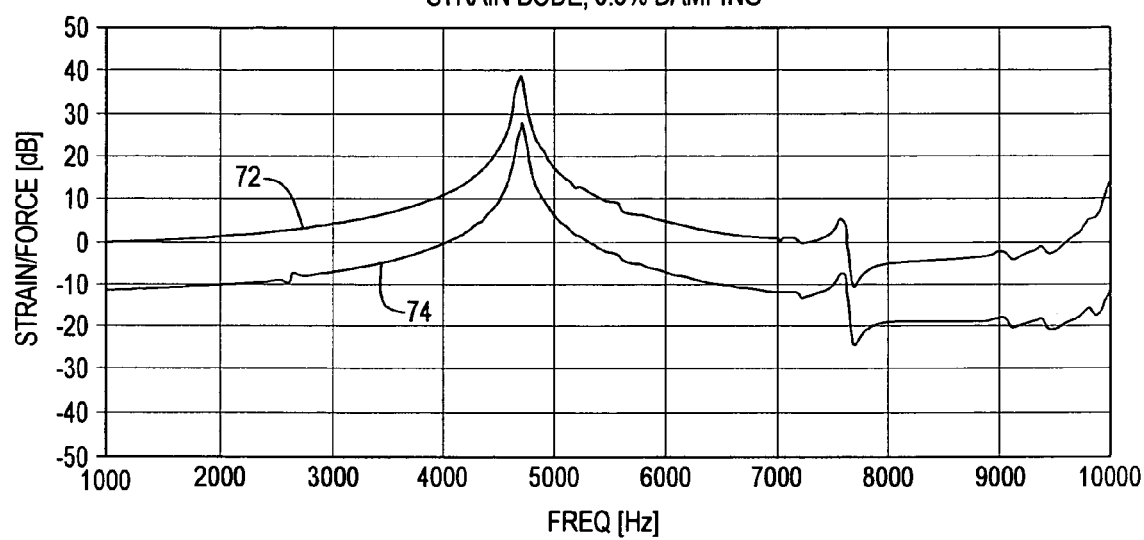
FIG. 5 shows gain vs. frequency bode plots, corresponding to sensor placement in a notch in the actuator arm according to the present invention, and a conventional sensor placement on the surface of the actuator arm.

FIG. 5 shows example strain/force gain (dB) vs. frequency bode plots, wherein a first bode plot 72 corresponds to sensor placement in a notch 54 in the actuator arm according to an embodiment of the present invention, and a second bode plot 74 corresponds to conventional sensor placement on the surface of the actuator arm. As the plots illustrate, there is a gain improvement of about 12 dB in sensor signal output when the sensor 52 is placed in a notch 54 according to the present invention compared to the conventional system. This is because when the sensor 52 is placed on the actuator arm surface as is conventional, strain from the arm is minimally communicated to only one surface of the sensor 52, whereas in the present invention strain from the actuator arm, deforms several walls of the notch 54 which are communicated to several walls of the sensor 52, thereby providing better sensor output performance. As such, an amplifier circuit for amplifying the sensor output signals becomes unnecessary.

Figure 6:
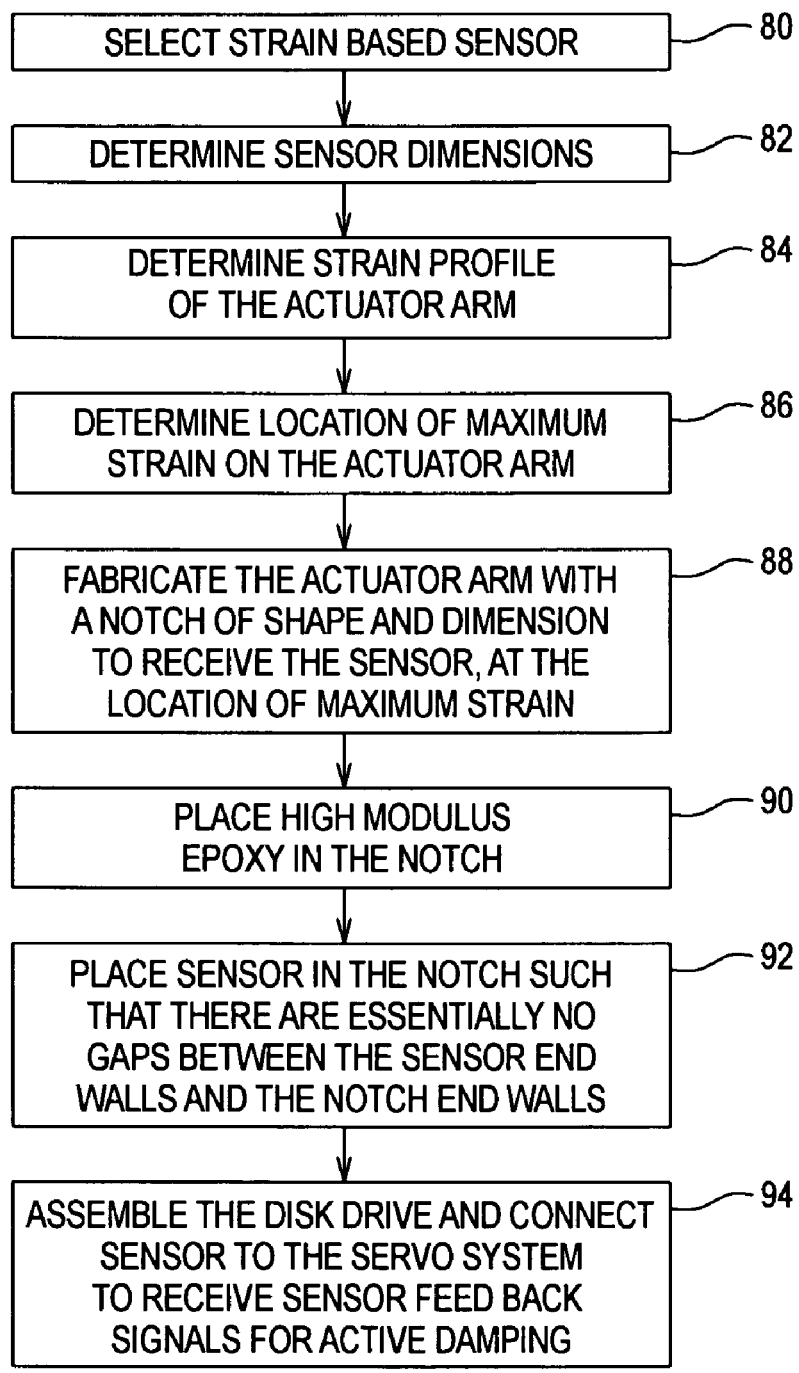
FIG. 6 shows an example process for manufacturing an actuator arm according to the present invention.

FIG. 6 shows an example process for manufacturing an actuator arm according to the present invention, including the steps of: selecting a strain based sensor 52 (step 80), determining the sensor dimensions (step 82), determining the strain profile of the actuator arm (step 84), determining location of maximum strain on the actuator arm based on the strain profile (step 86), fabricating the actuator arm with a notch 54 essentially having the shape and dimensions of the sensor 52, wherein the notch 54 is at said location of maximum strain on the arm (step 88), placing high modulus epoxy 68 on the walls of the notch 54 (step 90), placing the sensor 52 in the notch 54 such that there are essentially no gaps between the sensor end walls and the notch end walls (step 92), and assembling the disk drive including the actuator arm with the sensor 52, and connecting sensor 52 to the servo system to receive sensor feed back signals for active damping (step 94). The active damping process using the signals from the sensor 52 (placed in a notch 54 on the actuator arm according to the present), can be according to that disclosed in e.g. above-mentioned U.S. Pat. No. 6,064,540.

Referring back to FIGS. 3B–E, in the examples shown, the surfaces of the notch walls 60, 66 are flat. However, other surface configurations can also be implemented depending on the shape of the sensor 52. Therefore, although a rectangular shaped notch 54 is shown in FIGS. 3B–D, the notch 54 can be of arbitrary shape whereby a region of increased strain is generated, distorting the sensor 52 of essentially same shape and dimensions placed therein, to the same degree. This results in increased signal output from the sensor 52.

Figure 7:
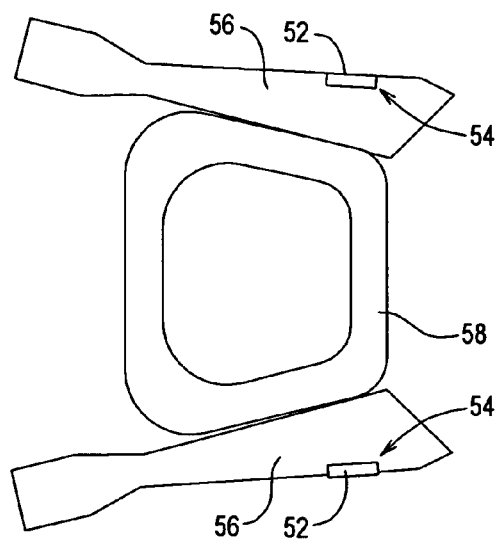
FIG. 7 shows another example actuator arm assembly according to the present invention, with two notches formed at different locations on the actuator arm assembly.
Figure 8:
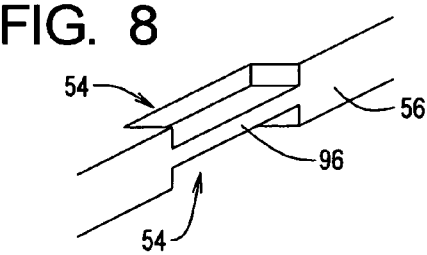
FIG. 8 shows another example according to the present invention, with two notches formed at essentially the same location on the actuator arm assembly, with a thin rib in between wherein a sensor can be placed in each notch.

Depending on the shape and dimensions of the sensor 52, different shapes and dimensions for the notch 54 can be designed to essentially provide maximum signal output from the sensor 52 when distorted by the walls 60, 66 of the notch 54. Further, as shown by example in FIG. 7 a second notch 54 can be formed on the actuator body 56, and a second sensor 52 placed therein. Or, as shown by example in FIG. 8, two notches 54 can be formed at essentially the same location on the actuator arm 56, with a thin rib 96 in between, wherein a sensor can be placed in each notch 54. Other embodiments are possible. Further, the strain sensor 52 can comprise e.g. a strain acceleration sensor or a strain rate sensor.

Figure 9:
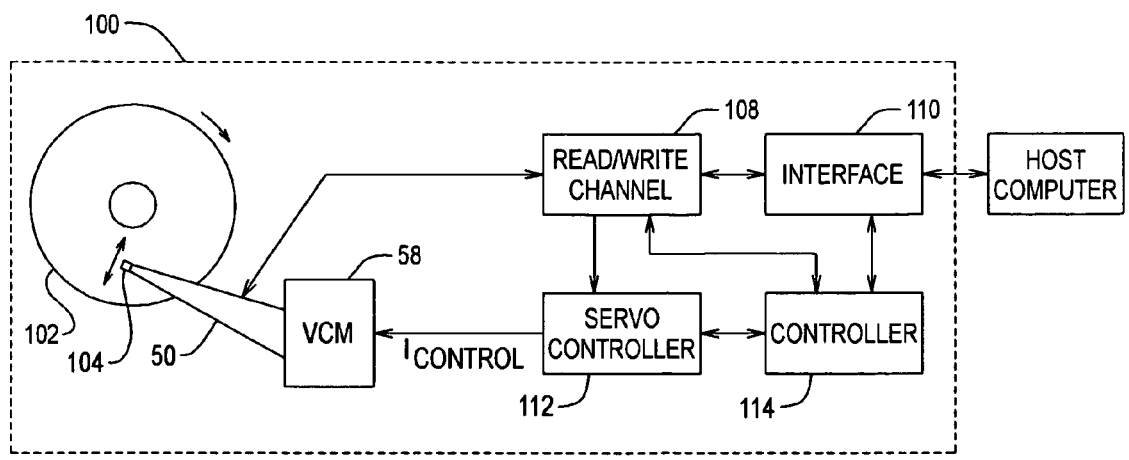
FIG. 9 shows a block diagram illustrating an example disk drive in which a actuator arm assembly according to the present invention is utilized.

The example actuator assembly 50 (FIGS. 3A–E) can be utilized in a disk drive as shown by example in FIG. 9 which illustrates a block diagram of an example disk drive 100, according to the present invention. The disk drive 100 can be coupled to an external host computer that uses the disk drive 100 as a mass storage device. It should be appreciated that the blocks illustrated in FIG. 9 are functional in nature and do not necessarily represent discrete hardware elements. For example, in one approach, two or more of the functional blocks within the disk drive 100 are implemented in software in a common digital processor. The disk drive 100 includes at least one data storage disk 102, at least one transducer head 104, the actuator arm assembly 50 including said rotary actuator (VCM) 58, a read/write channel 108, an interface unit 110, a servo controller 112 and a disk drive controller 114.

In another embodiment, the disk drive 100 includes multiple disks 102 in a vertical stack arrangement with one transducer 104 for each operative disk surface. Typically, both surfaces of each disk 102 will be operative for storing user data and, therefore, the disk drive 100 will include two transducers 102 for each disk 102 (single sided disk arrangements can also be used). In that case, the sensors 52 can be placed on the other side of the actuator pivot where the strain is high enough to show sway mode.

The interface unit 110 is operative for providing an interface between the disk drive 100 and the host computer. During read and write operations, the interface unit 110 provides a communications path, including data buffering functions, between the host computer and the read/write channel 108. In addition, the interface unit 110 is operative for receiving commands and requests from the host computer and directing them to the controller 114. The controller 114 then carries out the commands by appropriately controlling the elements within the disk drive 100.

During disk drive operation, the actuator 58 is operative for controllably positioning the transducers 104 with respect to their corresponding disk surfaces in response to a control signal (e.g., Icontrol) generated by the servo controller 112. The transducers 104 are all coupled to a single integrated arm assembly 50 and thus move together under the influence of the actuator 58. When performing a read or write operation, the controller 114 instructs the servo controller 112 to move one of the transducers 104 to a target track on a corresponding disk surface so that a data transfer can take place. The servo controller 112 then generates a control signal to move the identified transducer 104 from a present location to the indicated target track in a process known as a "seek" operation. Once the transducer 104 has arrived at the target track, the servo controller 112 enters a "track follow" mode during which the transducer 104 is maintained in a substantially centered position above the target track. The bulk of the data transfer between the transducer 104 and the target track occurs during this track follow mode.

The read/write channel 108 is operative for, among other things, performing the data transformations necessary to provide communication between host computer and the disk 102. For example, during a write operation, the read/write channel 108 converts digital data received from the host computer into an analog write current for delivery to one of the transducers 104. During a read operation, the read/write channel 108 provides the data transformations necessary for converting an analog read signal received from one of the transducers 104 into digital representation that can be recognized by the host computer. The read/write channel 108 is also operative for separating out servo information read by a transducer and for directing this servo information to the servo controller 112 for use in positioning the transducer.

The transducer 104 generates a position signal indicating a displacement of the transducer, wherein an active control mechanism including the controller 112 (and/or controller 114) electrically connected to the sensor 52 of the assembly arm 50, and the transducer 104, derives an adjustment signal from the sensor signal and combines the adjustment signal with said position signal to generate a feedback signal for driving said actuator 58 to stabilize the actuator arm assembly 50. The use of the feedback signal from the sensor 52 to stabilize the actuator assembly is known and described by example in the above-mentioned U.S. Pat. No. 6,064,540, and not repeated here.

The present invention has been described in considerable detail with reference to certain preferred versions thereof; however, other versions are possible. Therefore, the spirit and scope of the appended claims should not be limited to the description of the preferred versions contained herein.

What is claimed is:

1. An actuator arm assembly, comprising:
   an actuator arm;
   an actuator for moving said actuator arm whereby the arm assembly experiences vibrations, the actuator having a body with a recess formed therein; and
   a strain sensor fitted essentially inside said recess such that the sensor generates signals correlated to said vibrations, wherein the generated signals are used to drive said actuator to stabilize the actuator assembly.

2. The actuator arm assembly of claim 1, wherein the recess has interior surfaces to receive at least a portion of the sensor with essentially minimal clearance therebetween, whereby the sensor generates high gain boost signals correlated to said vibrations.

3. The actuator arm assembly of claim 1, wherein the recess has interior surfaces to receive at least a portion of the sensor such that said surfaces of the recess are in contact with the sensor.

4. The actuator arm assembly of claim 1, further comprising a high modulus epoxy in the recess to fill up gaps between surfaces of the recess and the sensor.

5. The actuator arm assembly of claim 1, wherein:
   the recess is positioned on the actuator in a selected location which is essentially a locus of high strain due to said vibration; and
   said vibrations in the actuator body cause compression and decompression of the strain sensor by the surfaces of the recess whereby the sensor generates signals correlated to said vibrations.

6. The actuator arm assembly of claim 1, wherein:
   the sensor is essentially rectangular;
   the recess has walls defining an essentially rectangular shape of similar dimensions to the sensor, for receiving the sensor;
   wherein the vibrations in the actuator body cause movement of said recess walls that are mechanically communicated to the sensor fitted in the recess, whereby the sensor generates signals correlated to said vibrations.

7. The actuator arm assembly of claim 1, further comprising a transducer on said arm for generating a position signal indicating a displacement of the transducer, wherein a controller connected to the sensor derives an adjustment signal from the sensor signal and combines the position signal with said adjustment signal to generate a feedback signal for driving said actuator to stabilize the actuator assembly.

8. The actuator arm assembly of claim 1, wherein said actuator comprises a coil and said sensor detects sway deformations of said coil produced by said vibrations.

9. The actuator arm assembly of claim 8, further comprising a coil support, wherein the recess is formed in the coil support and the sensor is fitted in the recess, wherein said sway deformations of said coil produce deformations of said coil support.

10. The actuator arm assembly of claim 9, wherein the sensor is fitted in the recess on the coil support to register said deformations of said coil support.

11. The actuator arm assembly of claim 1 wherein said sensor comprises at least one strain rate sensor for generating high gain boost signals correlated to said vibrations, thereby essentially eliminating a need for a gain amplifier.

12. The actuator arm assembly of claim 1, wherein said actuator is a rotary actuator.

13. The actuator arm assembly of claim 1, wherein said actuator is a disk drive actuator system.

14. A method of manufacturing an actuator system that generates feedback signals for stabilizing the actuator system, comprising the steps of:
   providing a strain sensor;
   providing an actuator arm assembly having a body including a recess formed thereon to receive the sensor; and
   fitting at least a portion of the sensor in the recess, wherein the sensor generates signals correlated to vibrations in the actuator arm assembly, the sensor signals being for feedback to a controller for stabilizing the actuator arm assembly.

15. The method of claim 14, wherein the step of providing the actuator arm assembly comprises the steps of:
   providing an actuator arm for carrying a transducer thereon;
   providing an actuator for moving the actuator arm wherein the actuator includes said recess; and
   assembling the actuator and the actuator arm to form the actuator arm assembly, wherein movement of the actuator arm by the actuator causes the actuator arm assembly to experience vibrations such that the sensor generates high boost gain signals correlated to the vibrations.

16. The method of claim 15, wherein the step of providing the actuator includes the steps of forming a recess in the actuator such that the recess has interior surfaces to receive at least a portion of the sensor with essentially minimal clearance therebetween, whereby the sensor generates said high gain boost signals correlated to said vibrations, essentially eliminating a need for a gain amplifier.

17. The method of claim 15, wherein the step of providing the actuator includes the steps of forming a recess in the actuator such that the recess has interior surfaces to receive at least a portion of the sensor wherein said surfaces of the recess are in contact with the senor.

18. The method of claim 15, wherein said vibrations in the actuator cause compression and decompression of the strain sensor by surfaces of the recess whereby the sensor generates signals correlated to said vibrations.

19. The method of claim 15, wherein the step of providing the actuator comprises the steps of:
   determining a position for the recess on the actuator that is the location of high strain due to said vibrations; and
   fabricating the actuator with said recess formed at the determined position.

20. The method of claim 14, wherein the step of fitting the sensor in the recess further comprises the steps of applying a high modulus epoxy to surfaces of the recess and then fitting the sensor in the recess, to fill up gaps between surfaces of the recess and the sensor.

21. A data recording disk drive comprising:
   a rotatable data disk having a plurality of data tracks;
   an actuator system having an arm assembly comprising: (i) an actuator arm, (ii) an actuator for moving said actuator arm whereby the arm assembly experiences vibrations, the actuator having a body with a recess formed therein, and a strain sensor fitted essentially inside said recess such that the sensor generates signals correlated to said vibrations;
   a read-write head mounted on said arm assembly for reading data from or writing data to said data disk and for generating a position signal indicating a displacement of said read-write head relative to a desired data track on said data disk; and an active control mechanism for stabilizing said actuator system based on signals from said sensor.

22. The disk drive of claim 21, wherein the recess has interior surfaces to receive at least a portion of the sensor with essentially minimal clearance therebetween, whereby the sensor generates high gain boost signals correlated to said vibrations.

23. The disk drive of claim 21, wherein the recess has interior surfaces to receive at least a portion of the sensor such that said surfaces of the recess are in contact with the sensor.

24. The disk drive of claim 21, further comprising a high modulus epoxy in the recess to fill up gaps between surfaces of the recess and the sensor.

25. The disk drive of claim 21, wherein:
the recess is positioned on the actuator in a selected location which is essentially a locus of high strain due to said vibration; and
said vibrations in the actuator body cause compression and decompression of the sensor by the surfaces of the recess whereby the sensor generates signals correlated to said vibrations.

26. The disk drive of claim 21, wherein:
the sensor is essentially rectangular in shape;
the recess has walls defining an essentially rectangular shape of similar dimensions to the sensor, for receiving the sensor;
wherein the vibrations in the actuator body cause movement of said recess walls that are mechanically communicated to the sensor fitted in the recess, whereby the sensor generates signals correlated to said vibrations.

27. The disk drive of claim 21, wherein said actuator comprises a coil and said sensor detects sway deformations of said coil produced by said vibrations.

28. The disk drive of claim 27, further comprising a coil support, wherein the recess is formed in the coil support and the sensor fitted in the recess, wherein said sway deformations of said coil produce deformations of said coil support.

29. The disk drive of claim 28, wherein the sensor is fitted in the recess on the coil support to register said deformations of said coil support.

30. The disk drive of claim 21 wherein said sensor comprises at least one strain rate sensor that generates essentially high gain boost signals correlated to said vibrations, essentially eliminating a need for a gain amplifier.

31. The disk drive of claim 21, wherein said actuator is a rotary actuator.

32. An actuator arm assembly, comprising:
an actuator arm;
an actuator for moving said actuator arm whereby the arm assembly experiences vibrations, the actuator having a body with a recess formed therein;
a strain sensor fitted essentially inside said recess such that the sensor generates signals correlated to said vibrations; and,
a high modulus epoxy in the recess to fill up gaps between surfaces of the recess and the sensor.

33. A method of manufacturing an actuator system that generates feedback signals for stabilizing the actuator system, comprising the steps of:
providing a strain sensor;
providing an actuator arm assembly having a body including a recess formed thereon to receive the sensor; and
fitting at least a portion of the sensor in the recess, wherein the sensor generates signals correlated to vibrations in the actuator arm assembly, the sensor signals being for feedback to a controller for stabilizing the actuator arm assembly,
wherein the step of fitting the sensor in the recess further comprises the steps of applying a high modulus epoxy to surfaces of the recess and then fitting the sensor in the recess, to fill up gaps between surfaces of the recess and the sensor.

34. A data recording disk drive comprising:
a rotatable data disk having a plurality of data tracks;
an actuator system having an arm assembly comprising: (i) an actuator arm, (ii) an actuator for moving said actuator arm whereby the arm assembly experiences vibrations, the actuator having a body with a recess formed therein, and a strain sensor fitted essentially inside said recess such that the sensor generates signals correlated to said vibrations;
a read-write head mounted on said arm assembly for reading data from or writing data to said data disk and for generating a position signal indicating a displacement of said read-write head relative to a desired data track on said data disk;
an active control mechanism for stabilizing said actuator system based on signals from said sensor; and,
a high modulus epoxy in the recess to fill up gaps between surfaces of the recess and the sensor.

* * * * *